(12) United States Patent
Lin et al.

(10) Patent No.: US 7,235,618 B2
(45) Date of Patent: Jun. 26, 2007

(54) POLYPROPYLENE POLYMERS

(75) Inventors: Chon-Yie Lin, Houston, TX (US); Bernard Louis Bossaert, Dilbeek (BE); Michael Chia-Chao Chen, Bellaire, TX (US); Susan Chia-Yu Yeh, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 118 days.

(21) Appl. No.: 10/344,952

(22) PCT Filed: Aug. 22, 2001

(86) PCT No.: PCT/US01/26191

§ 371 (c)(1), (2), (4) Date: Jul. 8, 2003

(87) PCT Pub. No.: WO02/16455

PCT Pub. Date: Feb. 28, 2002

(65) Prior Publication Data

US 2004/0171782 A1    Sep. 2, 2004

Related U.S. Application Data

(60) Provisional application No. 60/263,368, filed on Jan. 23, 2001, provisional application No. 60/227,101, filed on Aug. 22, 2000.

(51) Int. Cl.
*C08F 10/06*    (2006.01)

(52) U.S. Cl. .............. 526/348.1; 526/351; 526/134; 526/170; 526/65; 525/53; 525/248; 525/251

(58) Field of Classification Search ............. 526/348.1, 526/351, 134, 170, 65; 525/53, 248, 251
See application file for complete search history.

(56) References Cited

U.S. PATENT DOCUMENTS 6,143,686 A * 11/2000 Vizzini et al. .............. 502/152
6,268,062 B1 * 7/2001 DeMeuse .................... 428/461

* cited by examiner

*Primary Examiner*—Roberto Rabago
(74) *Attorney, Agent, or Firm*—Kevin M. Faulkner; Shawn H. Foster

(57) ABSTRACT

Embodiments of the present invention include a polypropylene homopolymer synthesized from a metallocene catalyst system and methods of forming the homopolymer, the homopolymer having an aluminum and chlorine recoverables value of less than 25 ppm and a xylene solubles of less than 1 wt % relative to the total weight of the homopolymer. The resulting homopolymer has other desirable properties such as a heat deflection temperature at 0.45 MPa of from 90° C. to 110° C., and a MWD value of from 1.7 to 5.0. These properties make embodiments of the homopolymer desirable for films, and in particular for capacitor films.

16 Claims, No Drawings

POLYPROPYLENE POLYMERS

CROSS REFERENCE TO RELATED APPLICATIONS

This application claims the benefit of Provisional application Nos. 60/227,101, filed Aug. 22, 2000, and 60/263,368, filed Jan. 23, 2001, herein incorporated by reference in their entireties.

FIELD OF THE INVENTION

The present invention relates generally to polyolefin polymers and to methods for their production and use, and more particularly to isotactic propylene polymers having a low ash content and other properties suitable for films and capacitor films.

BACKGROUND

Multiple stage polymerization processes are known in the art as is the use of metallocene catalyst systems. Multiple stage polymerization processes, such as two-stage polymerization processes, are generally used to prepare block copolymers which contain rubbery materials. Two-stage polymerization process products may include propylene block copolymers. In some instances, the propylene/ethylene copolymer portion of these block copolymers may be rubbery. In these instances, these products may be more suitable for molding applications rather than films. In other instances, two or more metallocenes may be used for the preparation of isotactic propylene polymers.

For some applications, a polymer such a polypropylene is desired having a very broad molecular weight range, while maintaining a high level of crystallinity or isotacticity. Furthermore, for many applications such as capacitor films where a low level of electrical conduction is desirable, it is ideal to have a low level of residual metals such as titanium, aluminum and ions such as chlorine, which are present in polypropylenes produced using traditional Ziegler-Natta catalysts. Low levels of these metals and ions are usually achieved in these polymers by washing or "deashing" the polymer alter production. However, even after this washing process, the level of conductible metals and ions still remains at an undesirable level. What is needed is a homopolymer such as polypropylene that is highly isotactic with a broad molecular weight distribution that also has a low metal residuals prior to washing. No polypropylene disclosed in the prior art to date serves these purposes.

Related patents and patent applications include: U.S. Pat. Nos. 6,127,042, 6,090,325, 6,094,337, 5,280,074, 5,322,902, 5,346,925, 5,350,817, 5,483,002, and 5,724,222; U.S. patent application Ser. No. 09/293,565, now abandoned (assigned to the assignee of the present invention), and Canadian Patent Application No. 2,133,181. What is needed is a film material including the desirable characteristics of metallocene-catalyzed polymers, and having the improved molecular weight distribution and low metal residues.

SUMMARY

Embodiments of the present invention include a polypropylene homopolymer synthesized from a metallocene catalyst system, the homopolymer comprising isotactic propylene homopolymer having an aluminum and chlorine recoverables value of less than 25 ppm and a xylene solubles of less than 1 wt % relative to the total weight of the homopolymer. The resulting final homopolymer has other desirable properties such as a heat deflection temperature at 0.45 MPa of from 90° C. to 110° C., and a MWD value of from 1.7 to 5.0. These properties make embodiments of the homopolymer desirable for films, and in particular for capacitor films.

Embodiments of the invention also include a two-step process for producing isotactic polypropylene having characteristics desirable for films and capacitor films. The process includes the steps of: (a) first, polymerizing propylene in the presence of a metallocene, an activator compound, and a first concentration of chain transfer agent sufficient to produce a first propylene homopolymer, producing a first propylene homopolymer; (b) second, polymerizing propylene in the presence of the first propylene homopolymer, and also in the presence of a second concentration of chain transfer agent sufficient to produce the isotactic polypropylene having an aluminum and chlorine recoverables value of less than 25 ppm; and (c) recovering isotactic polypropylene. The activator compound is typically a highly fluorinated trisarylboron compound. Examples of desirable activators include trisperfluorophenylboron, tris(3,5-di (trifluoromethyl)phenyl)boron, tris(di-t-butylmethylsilyl) perfluorophenylboron, and mixtures thereof.

DETAILED DESCRIPTION

Embodiments of the present invention relate to (1) polyolefin polymers, (2) methods for making polyolefin polymers; and (3) products made from polyolefin polymers. The methods of this invention involve the use of metallocene catalyst systems that comprise at least one metallocene component and at least one activator. Preferably, these catalyst system components are supported on a support material.

Preferably, the metallocene catalyst system is the product of contacting at least three components: (1) one or more metallocenes; (2) one or more activators; and (3) one or more fluorided support compositions.

As used herein, the phrase "fluorided support" or "fluorided support composition" means a support, desirably particulate and porous, which has been contacted with at least one inorganic fluorine containing compound. For example, the fluorided support composition can be a silicon dioxide support wherein a portion of the silica hydroxyl groups has been replaced with fluorine or fluorine containing compounds.

As used herein, "isotactic" is defined as having at least 40% isotactic pentads according to analysis by $^{13}$C-NMR. As used herein, "highly isotactic" is defined as having at least 60% isotactic pentads according to analysis by $^{13}$C-NMR.

As used herein, "molecular weight" means weight average molecular weight (Mw) and "molecular weight distribution," (MWD), means Mw divided by number average molecular weight (Mn) as determined by gel permeation chromatography (GPC).

As used herein, "metal and ionic recoverables" refers to the metal, either ionized or in a neutral state, and non-metal ions that can be recovered from finished homopolymer. Such metals include, but are not limited to ions or neutral species of Ti, Al, Mg, Zr, and Si. Also included as an ionic recoverable are such species as halogen ions, and halogen containing oxide species. Reference may be made to specific metal and/or ion recoverables, such as aluminum and chlorine recoverables.

As used herein, the term "polypropylene" refers to homopolymers or copolymers made from propylene derived units, and $C_3$ to $C_{12}$ α-olefin derived units when a copolymer.

As used herein, the terms "catalyst system" and "metallocene catalyst system" include at least one or more metallocenes, and at least one secondary component such as activators and cocatalysts, of which alumoxanes and boranes are broad classes of such compounds, and at least one support such as a silica support which may be fluorided which may also be present.

Metallocene Component

The catalyst system of the present invention has as a component at least one metallocene. As used herein "metallocene" refers generally to compounds represented by the formula $Cp_mMR_nX_q$ wherein Cp is a cyclopentadienyl ring which may be substituted, or derivative thereof which may be substituted, M is a Group 4, 5, or 6 transition metal, for example titanium, zirconium, halfnium, vanadium, niobium, tantalum, chromium, molybdenum and tungsten, R is a hydrocarbyl group or hydrocarboxy group having from one to 20 carbon atoms, X is a halogen or hydrogen, and m=1-3, n=0-3, q=0-3, and the sum of m+n+q is equal to the oxidation state of the transition metal.

Methods for making and using metallocenes are disclosed in, for example U.S. Pat. Nos. 4,530,914; 4,542,199; 4,769,910; 4,808,561; 4,871,705; 4,933,403; 4,937,299; 5,017,714; 5,026,798; 5,057,475; 5,120,867; 5,278,119; 5,304,614; 5,324,800; 5,350,723, 6,143,686; and 5,391,790.

One embodiment of the metallocenes used in the catalyst system of the invention are represented by the structure (1):

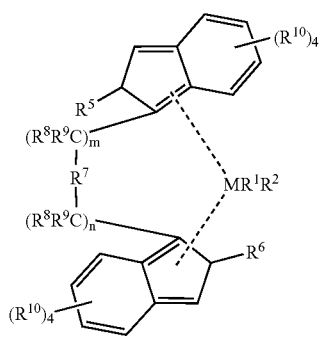

(1)

wherein M is a metal of Group 4, 5, or 6 of the Periodic Table, zirconium (Zr), halfnium (Hf) or titanium (Ti) in one embodiment.

In structure (1), $R^1$ and $R^2$ are identical or different, and are one of a hydrogen atom, a $C_1$-$C_{10}$ alkyl group, a $C_1$-$C_3$ alkyl group in another embodiment, a $C_1$-$C_{10}$ alkoxy group, a $C_1$-$C_3$ alkoxy group in another embodiment, a $C_6$-$C_{10}$ aryl group, a $C_6$-$C_8$ aryl group in another embodiment, a $C_6$-$C_{10}$ aryloxy group, a $C_6$-$C_8$ aryloxy group in another embodiment, a $C_2$-$C_{10}$ alkenyl group, a $C_2$-$C_4$ alkenyl group in another embodiment, a $C_7$-$C_{40}$ arylalkyl group, a $C_7$-$C_{10}$ arylalkyl group in another embodiment, a $C_7$-$C_{40}$ alkylaryl group, a $C_7$-$C_{12}$ alkylaryl group in another embodiment, a $C_8$-$C_{40}$ arylalkenyl group, a $C_8$-$C_{12}$ arylalkenyl group in another embodiment, or a halogen atom, preferably chlorine. In another embodiment, $R_1$ and $R_2$ can be an alkyl diene or other diene compound that is able to provide two points of unsaturation for association with the metal center M of (1).

In structure (1), $R^5$ and $R^6$, being in the so called "2" position on the indenyl ring, are identical or different and are one of a halogen atom, a fluorine, chlorine or bromine atom in one embodiment, a $C_1$-$C_{10}$ alkyl group, a $C_1$-$C_4$ alkyl group in another embodiment, which may be halogenated, a $C_6$-$C_{10}$ aryl group, which may be halogenated, a $C_6$-$C_8$ aryl group in another embodiment, a $C_2$-$C_{10}$ alkenyl group, a $C_2$-$C_4$ alkenyl group in another embodiment, a $C_7$-$C_{40}$ arylalkyl group, a $C_7$-$C_{10}$ arylalkyl group in another embodiment, a $C_7$-$C_{40}$ alkylaryl group, a $C_7$-$C_{12}$ alkylaryl group in another embodiment, a $C_8$-$C_{40}$ arylalkenyl group, a $C_8$-$C_{12}$ arylalkenyl group in another embodiment, a $-NR_2^{15}$, $-SR^{15}$, $-OR^{15}$, $-OSiR_3^{15}$ or $-PR_2^{15}$ radical, wherein $R^{15}$ is one of a halogen atom, a chlorine atom in another embodiment, a $C_1$-$C_{10}$ alkyl group, a $C_1$-$C_3$ alkyl group in another embodiment, or a $C_6$-$C_{10}$ aryl group, a $C_6$-$C_9$ aryl group in another embodiment.

Also, in structure (1), $R^7$ is

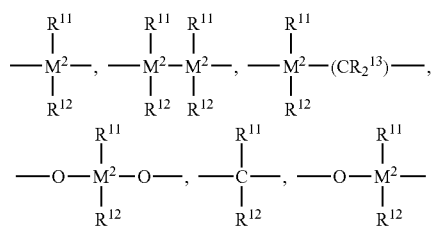

$-B(R^{11})-$, $-Al(R^{11})-$, $-Ge-$, $-Sn-$, $-O-$, $-S-$, $-SO-$, $-SO_2-$, $-N(R^{11})-$, $-CO-$, $-P(R^{11})-$, or $-P(O)(R^{11})-$, wherein $R^{11}$, $R^{12}$ and $R^{13}$ are identical or different and are a hydrogen atom, a halogen atom, a $C_1$-$C_{20}$ alkyl group, a $C_1$-$C_{10}$ alkyl group in another embodiment, a $C_1$-$C_{20}$ fluoroalkyl group, a $C_1$-$C_{10}$ fluoroalkyl group in another embodiment, a $C_6$-$C_{30}$ aryl group, a $C_6$-$C_{20}$ aryl group in another embodiment, a $C_6$-$C_{30}$ fluoroaryl group, a $C_6$-$C_{20}$ fluoroaryl group in another embodiment, a $C_1$-$C_{20}$ alkoxy group, a $C_1$-$C_{10}$ alkoxy group in another embodiment, a $C_2$-$C_{20}$ alkenyl group, a $C_2$-$C_{10}$ alkenyl group in another embodiment, a $C_7$-$C_{40}$ arylalkyl group, a $C_7$-$C_{20}$ arylalkyl group in another embodiment, a $C_8$-$C_{40}$ arylalkenyl group, a $C_8$-$C_{22}$ arylalkenyl group in another embodiment, a $C_7$-$C_{40}$ alkylaryl group, a $C_7$-$C_{20}$ alkylaryl group in another embodiment, or $R^{11}$ and $R^{12}$, or $R^{11}$ and $R^{13}$, together with the atoms binding them, can form ring systems.

In structure (1), $M^2$ is silicon (Si), germanium (Ge) or tin (Sn), silicon (Si) or germanium (Ge) in one embodiment, and most desirably silicon (Si). Also, $R^8$ and $R^9$ are identical or different and have the meanings stated for $R^{11}$. Further, m and n are identical or different and are zero, 1 or 2, zero or 1 in one embodiment, and m plus n being zero, 1 or 2, desirably zero or 1.

Finally, in structure (1), the radicals $R^{10}$ are identical or different and have the meanings stated for $R^{11}$, $R^{12}$ and $R^{13}$. In one embodiment, $R^{10}$ is a phenyl group. The $R^{10}$ group or groups can be substituted on any position or positions on the indenyl ring system that is not already substituted as described above. Two adjacent $R^{10}$ radicals can be joined together to form a ring system, preferably a ring system containing from 4-6 carbon atoms.

Alkyl refers to straight or branched chain saturated, non-aromatic hydrocarbyl substituents. Alkenyl refers to strait or branched chain unsaturated substituents. Halogen (halogenated) refers to fluorine, chlorine, bromine or iodine atoms, preferably fluorine or chlorine. Aryl refers to cyclic aromatic moieties such as phenyl or naphthyl. Alkylaryl refers to an alkyl-substituted aryl moiety, and arylalky refers to an aryl-substituted alkyl moiety.

In another embodiment, the metallocene component is a compound of the structures (2) or (3):

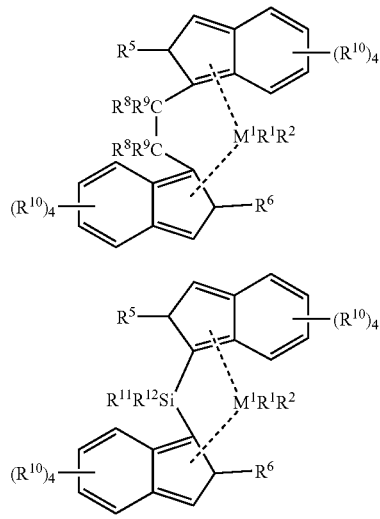

wherein $M^1$ is zirconium (Zr) or halfnium (Hf), $R^1$ and $R^2$ are methyl or chlorine, and $R^5$, $R^6$, $R^8$, $R^9$, $R^{10}$, $R^{11}$ and $R^{12}$ have the above-mentioned meanings.

The molecules represented by structures (1) through (3) can exist as both chiral and achiral structures. These chiral metallocenes may be used as a racemic (rac) mixture for the preparation of highly isotactic polyolefinic polymers such as isotactic polypropylene homopolymer or copolymer. It is also possible to use the pure R or S form. An optically active polymer can be prepared with these pure stereoisomeric forms. Preferably, the meso form of the metallocene is removed to ensure stereoregular polymerization takes place when the metallocene is used as a polymerization catalyst. For special products it is also possible to use rac/meso mixtures. Separation of the stereoisomers can be accomplished by known literature techniques.

Illustrative but non-limiting examples of the at least one metallocene component of the catalyst system includes the following:
Dimethylsilandiylbis(2-methyl-4-phenyl-1-indenyl)zirconium dichloride
Dimethylsilandiylbis(2-methyl-4,5-benzoindenyl)zirconium dichloride;
Dimethylsilandiylbis(2-methyl-4,6-diisopropylindenyl)zirconium dichloride;
Dimethylsilandiylbis(2-ethyl-4-phenyl-1-indenyl)zirconium dichloride;
Dimethylsilandiylbis(2-methyl-4-(α-naphthyl)-1-indenyl)zirconium dichloride
Dimethylsilandiylbis(2-ethyl-4-(α-naphthyl)-1-indenyl)zirconium dichloride
Dimethylsilandiylbis(2-methyl-4-(β-naphthyl)-1-indenyl)zirconium dichloride,
Dimethylsilandiylbis(2-ethyl-4-(β-naphthyl)-1-indenyl)zirconium dichloride
Phenyl(methyl)silandiylbis(2-methyl-4-phenyl-1-indenyl)zirconium dichloride,
Dimethylsilandiylbis(2-methyl-4-(1-naphthyl)-1-indenyl)zirconium dichloride,
Dimethylsilandiylbis(2-methyl-4-(2-naphthyl)-1-indenyl)zirconium dichloride,
Dimethylsilandiylbis(2-methyl-indenyl)zirconium dichloride,
Dimethylsilandiylbis(2-methyl-4,5-diisopropyl-1-indenyl)zirconium dichloride,
Dimethylsilandiylbis(2,4,6-trimethyl-1-indenyl)zirconium dichloride,
Phenyl(methyl)silandiylbis(2-methyl-4,6-diisopropyl-1-indenyl)zirconium dichloride,
1,2-Ethandiylbis(2-methyl-4,6-diisopropyl-1-indenyl)zirconium dichloride,
1,2-Butandiylbis(2-methyl-4,6-diisopropyl-1-indenyl)zirconium dichloride,
Dimethylsilandiylbis(2-methyl-4-ethyl-1-indenyl)zirconium dichloride,
Dimethylsilandiylbis(2-methyl-4-isopropyl-1-indenyl)zirconium dichloride,
Dimethylsilandiylbis(2-methyl-4-t-butyl-1-indenyl)zirconium dichloride,
Phenyl(methyl)silandiylbis(2-methyl-4-isopropyl-1-indenyl)zirconium dichloride,
Dimethylsilandiylbis(2-ethyl-4-methyl-1-indenyl)zirconium dichloride,
Dimethylsilandiylbis(2,4-dimethyl-1-indenyl)zirconium dichloride,
Dimethylsilandiylbis(2-methyl-4-ethyl-1-indenyl)zirconium dichloride,
Dimethylsilandiylbis(2-methyl-4-(5-acenaphthyl)-1-indenyl)zirconium dichloride,
Phenyl(methyl)silandiylbis(2-methyl-4,5-benzo-1-indenyl)zirconium dichloride,
Phenyl(methyl)silandiylbis(2-methyl-4,5-(methylbenzo)-1-indenyl)zirconium dichloride,
Phenyl(methyl)silandiylbis(2-methyl-4,5-(tetramethylbenzo)-1-indenyl)zirconium dichloride,
Phenyl(methyl)silandiylbis(2-methyl-4-(5-acenaphthyl)-1-indenyl)zirconium dichloride,
1,2-Ethandiylbis(2-methyl-4,5-benzo-1-indenyl)zirconium dichloride,
1,2-Butandiylbis(2-methyl-4,5-benzo-1-indenyl)zirconium dichloride,
Dimethylsilandiylbis(2-methyl-4,5-benzo-1-indenyl)zirconium dichloride,
1,2-Ethandiylbis(2,4,7-trimethyl-1-indenyl)zirconium dichloride,
Dimethylsilandiylbis(2-methyl-1-indenyl)zirconium dichloride,
1,2-Ethandiylbis(2-methyl-1-indenyl)zirconium dichloride,
Phenyl(methyl)silandiylbis(2-methyl-1-indenyl)zirconium dichloride,
Diphenylsilandiylbis(2-methyl-1-indenyl)zirconium dichloride,
1,2-Butandiylbis(2-methyl-1-indenyl)zirconium dichloride,
Dimethylsilandiylbis(2-ethyl-1-indenyl)zirconium dichloride,
Dimethylsilandiylbis(2-methyl-5-isobutyl-1-indenyl)zirconium dichloride,
Phenyl(methyl)silandiylbis(2-methyl-5-isobutyl-1-indenyl)zirconium dichloride,
Dimethylsilandiylbis(2-methyl-5-t-butyl-1-indenyl)zirconium dichloride, Dimethylsilandiylbis(2,5,6-trimethyl-1-indenyl)zirconium dichloride,
Dimethylsilandiylbis(2-methyl-4-phenyl-1-indenyl)zirconium dimethyl,
Dimethylsilandiylbis(2-methyl-4,5-benzoindenyl)zirconium dimethyl;
Dimethylsilandiylbis(2-methyl-4,6-diisopropylindenyl)zirconium dimethyl;
Dimethylsilandiylbis(2-ethyl-4-phenyl-1-indenyl)zirconium dimethyl;
Dimethylsilandiylbis(2-methyl-4-(α-naphthyl)-1-indenyl)zirconium dimethyl
Dimethylsilandiylbis(2-ethyl-4-(α-naphthyl)-1-indenyl)zirconium dimethyl
Dimethylsilandiylbis(2-methyl-4-(β-naphthyl)-1-indenyl)zirconium dimethyl,
Dimethylsilandiylbis(2-ethyl-4-(β-naphthyl)-1-indenyl)zirconium dimethyl
Phenyl(methyl)silandiylbis(2-methyl-4-phenyl-1-indenyl)zirconium dimethyl,
Dimethylsilandiylbis(2-methyl-4-(1-naphthyl)-1-indenyl)zirconium dimethyl,
Dimethylsilandiylbis(2-methyl-4-(2-naphthyl)-1-indenyl)zirconium dimethyl,
Dimethylsilandiylbis(2-methyl-indenyl)zirconium dimethyl,
Dimethylsilandiylbis(2-methyl-4,5-diisopropyl-1-indenyl)zirconium dimethyl,
Dimethylsilandiylbis(2,4,6-trimethyl-1-indenyl)zirconium dimethyl,
Phenyl(methyl)silandiylbis(2-methyl-4,6-diisopropyl-1-indenyl)zirconium dimethyl,
1,2-Ethandiylbis(2-methyl-4,6-diisopropyl-1-indenyl)zirconium dimethyl,
1,2-Butandiylbis(2-methyl-4,6-diisopropyl-1-indenyl)zirconium dimethyl,
Dimethylsilandiylbis(2-methyl-4-ethyl-1-indenyl)zirconium dimethyl,
Dimethylsilandiylbis(2-methyl-4-isopropyl-1-indenyl)zirconium dimethyl,
Dimethylsilandiylbis(2-methyl-4-t-butyl-1-indenyl)zirconium dimethyl,
Phenyl(methyl)silandiylbis(2-methyl-4-isopropyl-1-indenyl)zirconium dimethyl,
Dimethylsilandiylbis(2-ethyl-4-methyl-1-indenyl)zirconium dimethyl,
Dimethylsilandiylbis(2,4-dimethyl-1-indenyl)zirconium dimethyl,
Dimethylsilandiylbis(2-methyl-4-ethyl-1-indenyl)zirconium dimethyl,
Dimethylsilandiylbis(2-methyl-4-(5-acenaphthyl)-1-indenyl)zirconium dimethyl,
Phenyl(methyl)silandiylbis(2-methyl-4,5-benzo-1-indenyl)zirconium dimethyl,
Phenyl(methyl)silandiylbis(2-methyl-4,5-(methylbenzo)-1-indenyl)zirconium dimethyl,
Phenyl(methyl)silandiylbis(2-methyl-4,5-(tetramethylbenzo)-1-indenyl) zirconium dimethyl,
Phenyl(methyl)silandiylbis(2-methyl-4-(5-acenaphthyl)-1-indenyl)zirconium dimethyl,
1,2-Ethandiylbis(2-methyl-4,5-benzo-1-indenyl)zirconium dimethyl,
1,2-Butandiylbis(2-methyl-4,5-benzo-1-indenyl)zirconium dimethyl,
Dimethylsilandiylbis(2-methyl-4,5-benzo-1-indenyl)zirconium dimethyl,
1,2-Ethandiylbis(2,4,7-trimethyl-1-indenyl)zirconium dimethyl,
Dimethylsilandiylbis(2-methyl-1-indenyl)zirconium dimethyl,
1,2-Ethandiylbis(2-methyl-1-indenyl)zirconium dimethyl,
Phenyl(methyl)silandiylbis(2-methyl-1-indenyl)zirconium dimethyl,
Diphenylsilandiylbis(2-methyl-1-indenyl)zirconium dimethyl,
1,2-Butandiylbis(2-methyl-1-indenyl)zirconium dimethyl,
Dimethylsilandiylbis(2-ethyl-1-indenyl)zirconium dimethyl,
Dimethylsilandiylbis(2-methyl-5-isobutyl-1-indenyl)zirconium dimethyl,
Phenyl(methyl)silandiylbis(2-methyl-5-isobutyl-1-indenyl)zirconium dimethyl,
Dimethylsilandiylbis(2-methyl-5-t-butyl-1-indenyl)zirconium dimethyl,
Dimethylsilandiylbis(2,5,6-trimethyl-1-indenyl)zirconium dimethyl, and the like.

These metallocene catalyst components are described in detail in U.S. Pat. Nos. 6,143,686, 5,145,819; 5,243,001; 5,239,022; 5,329,033; 5,296,434; and 5,276,208; and 5,374,752; and EP 549 900 and 576 970. Typically, these metallocenes can be described as bis(substituted-indenyl)metallocenes. In one embodiment of the invention, a bis(substituted-indenyl)metallocene is a component of the catalyst system, the bis(substituted-indenyl)metallocene including both the dichloride and dimethyl-Group 4 metal.

In yet another embodiment of the invention, the metallocene component is a bridged 2,4 di-substituted indenyl metallocene, wherein at least the 2 and 4 positions on the indenyl ring are substituted as described in structure (1). Examples of such metallocenes are rac-:
Dimethylsilandiylbis(2-methyl-4-phenyl-1-indenyl)zirconium dichloride,
Dimethylsilandiylbis(2,4-dimethylindenyl)zirconium dichloride,
Dimethylsilandiylbis(2,5,6-trimethylindenyl)zirconium dichloride,
Dimethylsilandiylbis(4,5,6,7-tetrahydroindenyl)zirconium dichloride,
Dimethylsilandiylbis(2-methyl-4,5-benzoindenyl)zirconium dichloride,
Dimethylsilandiylbis(2-methyl-4-phenyl-1-indenyl)zirconium dimethyl,
Dimethylsilandiylbis(2-methyl-4,5-benzoindenyl)zirconium dimethyl,
Dimethylsilandiylbis(2-methyl-4,6-diisopropylindenyl)zirconium dimethyl,
Dimethylsilandiylbis(2-ethyl-4-phenyl-1-indenyl)zirconium dimethyl,
Dimethylsilandiylbis(2-methyl-4-(α-naphthyl)-1-indenyl)zirconium dimethyl,
Dimethylsilandiylbis(2-methyl-4-(β-naphthyl)-1-indenyl)zirconium dimethyl,
Phenyl(methyl)silandiylbis(2-methyl-4-phenyl-1-indenyl)zirconium dimethyl,
Dimethylsilandiylbis(2-methyl-4-(1-naphthyl)-1-indenyl)zirconium dimethyl,
Dimethylsilandiylbis(2-methyl-4-(2-naphthyl)-1-indenyl)zirconium dimethyl, and
Dimethylsilandiylbis(2-methyl-indenyl)zirconium dimethyl.

In yet another embodiment of the invention, the metallocene component is a bridged 4-phenyl-1-indenyl substituted metallocene such as dimethylsilandiylbis(2-methyl-4- phenyl-1-indenyl)zirconium dichloride and phenyl(methyl) silandiylbis(2-methyl-4-phenyl-1-indenyl)zirconium dimethyl, and the like, wherein the 2-position is substituted as described in structure (1), and the 4-position is phenyl substituted. The bridged 4-phenyl-1-indenyl substituted metallocene may be described as in structure (4):

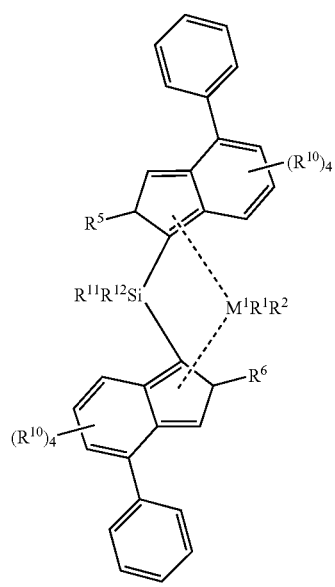

(4)

wherein $R^5$, $R^6$, $R^{10}$, $R^{11}$ and $R^{12}$ are as defined above, $M^1$ is zirconium (Zr) or halfnium (Hf), and $R^1$ and $R^2$ are either a halogen, hydrogen, or methyl, the phenyl group is in the so called "4" position on the indenyl ring. $R^5$ and $R^6$ are $C_1$ to $C_5$ alkyl groups in a desirable embodiment. Embodiments of the structure (3) are dimethylsilandiylbis(2-methyl-4-phenyl-1-indenyl)zirconium dichloride, phenyl(methyl)silandiylbis(2-methyl-4-phenyl-1-indenyl)zirconium dichloride dimethylsilandiylbis(2-methyl-4-phenyl-1-indenyl)zirconium dimethyl, and phenyl(methyl)silandiylbis(2-methyl-4-phenyl-1-indenyl)zirconium dimethyl. When $R^1$ and/or $R^2$ are halogens such as chloride, the catalyst system desirably includes a Lewis Acid such as an alkyl aluminum compound, an example of which include triethylaluminum (TEAL) and methylaluminumoxane (MAO).

The metallocene component selected for use in the catalyst system of this invention is a metallocene which, when used alone, produces isotactic, crystalline propylene polymer and when used in combination with another metallocene, produces polymer having the attributes desired for the particular application of interest. Desirable metallocenes are those selected from formulas 2 and/or 3 which when used alone to produce propylene homopolymer, are capable of producing an isotactic polymer having a weight average molecular weight of from 25,000 to 200,000 at commercially attractive temperatures of from 50° C. to 120° C.

In another embodiment of the invention, a comonomer may be used with propylene to form a copolymer suitable for the fiber and fabric. The metallocenes used may show different molecular weight responses when in the presence of comonomer. This will also affect the molecular weight distribution of the product. For example, we have found that the incorporation of up to 10 wt % comonomer such as a $C_2$ to $C_{12}$ α-olefin comonomer in one embodiment, and up to 5 wt % ethylene comonomer in another embodiment, during the polymerization process as described herein results in a substantial broadening of the molecular weight distribution at the high molecular weight end.

Additional broadening of molecular weight distribution may be practiced through reactor process techniques. For example, operating the different stages of a multiple stage polymerization process with varying levels of hydrogen, a molecular weight regulator, is known in the art to produce broadening of molecular weight distribution. Also, the resin may be spiked post blend with a Ziegler-Natta produced polymer, or other polymer having a very low or high MFR.

Activators

Embodiments of the activator component are herein described. Metallocenes are generally used in combination with some form of activator in order to create an active catalyst system. The term "activator" is defined herein to be any compound or component, or combination of compounds or components, capable of enhancing the ability of one or more metallocenes to polymerize olefins to polyolefins.

In one embodiment, ionizing activators are used to activate the metallocenes. These activators can be "non-ionic" or "ionic" (also called non-coordinating anion activators or NCA activators). The ionic activators are compounds such as tri(n-butyl)ammonium tetrakis(pentaflurophenyl)boron, which ionize the neutral metallocene compound. Such ionizing compounds may contain an active proton, or some other cation associated with but not coordinated or only loosely associated with the remaining ion of the ionizing compound. Combinations of activators may also be used, for example, alumoxane and ionizing activators in combinations, see for example, WO 94/07928. The non-ionic activator precursors that can serve as the NCA activators are strong Lewis acids with non-hydrolyzable ligands, at least one of which is electron-withdrawing, such as those Lewis acids known to abstract an anionic fragment from dimethyl zirconocene (biscyclopentadienyl zirconium dimethyl) e.g., trisperfluorophenyl boron, trisperfluoronaphthylboron, or trisperfluorobiphenyl boron, and other highly fluorinated trisaryl boron compounds.

The term "non-coordinating anion" describes an anion which either does not coordinate to the cationic metallocene or which is only weakly coordinated to said cation thereby remaining sufficiently labile to be displaced by a neutral Lewis base. "Compatible" noncoordinating anions are those which are not degraded to neutrality when the initially formed complex decomposes. Further, the anion will not transfer an anionic substituents or fragment to the cation so as to cause it to form a neutral four coordinate metallocene compound and a neutral by-product from the anion. Non-coordinating anions useful in accordance with this invention are those which are compatible, stabilize the metallocene cation in the sense of balancing its ionic charge in a +1 state, yet retain sufficient lability to permit displacement by an ethylenically or acetylenically unsaturated monomer during polymerization.

In a desirable embodiment of the invention, the activator and metallocene components are contacted with a support such as a silicon or fluorided silicon support (discussed further below). Thus, these NCA activator precursors typically do not possess any reactive ligands which can be protonated by the hydroxyl groups of the metal oxide (the silanol group proton) of the support, when present. For example, any Group 13 element based Lewis acids having only alkyl, halo, alkoxy, and/or amido ligands, which are readily hydrolyzed in aqueous media, are not suitable. At least one ligand of the NCA activator must be sufficiently electron-withdrawing to achieve the needed acidity, for example, trisperfluorophenyl boron, under typical reaction conditions.

Typical metal/metalloid centers for the NCA activator will include boron, aluminum, antimony, arsenic, phosphorous and gallium. In one embodiment, the NCA activator is a neutral compound comprising a Group 13 metalloid center with a complement of ligands together sufficiently electron-withdrawing such that the Lewis acidity is greater than or equal to that of $AlCl_3$. Examples include trisperfluorophenylboron, tris(3,5-di(trifluoromethyl)phenyl)boron, tris(di-t-butylmethylsilyl)perfluorophenylboron, and other highly fluorinated trisarylboron compounds. Other suitable activators are disclosed by Chen and Marks, 100 *Chemical Reviews* 1392-1434 (2000); Yang et al., 116 *J. Am. Chem. Soc.* 10015-10031 (1994); Yang et al., 113 *J. Am. Chem. Soc.* 3623-3625 (1991); Chien et al. 113 *J. Am. Chem. Soc.* 8570-8571 (1991); Bochmann et al. 12 Organometallics 633-640 (1999); Herfert et al. 14 *Makromol. Chem., Rapid Commun.* 91-96 (1993); and in EP 0 704 463 and EP 0 513 380.

The use of ionizing ionic compounds not containing an active proton but capable of producing both the active metallocene cation and a noncoordinating anion is also known. See, EP-A-0 426 637 and EP-A-0 573 403. An additional method of making the ionic catalysts uses ionizing anion pre-cursors which are initially neutral Lewis acids but form the cation and anion upon ionizing reaction with the metallocene compounds, for example the use of tris (pentafluorophenyl)boron. See EP-A-0 520 732. Ionic catalysts for addition polymerization can also be prepared by oxidation of the metal centers of transition metal compounds by anion pre-cursors containing metallic oxidizing groups along with the anion groups, see EP-A-0 495 375. Examples of suitable ionic NCA activators, include:

trialkyl-substituted ammonium salts such as:
  triethylammonium tetraphenylborate;
  tripropylammonium tetraphenylborate;
  tri(n-butyl)ammonium tetraphenylborate;
  trimethylammonium tetrakis(p-tolyl)borate;
  trimethylammonium tetrakis(o-tolyl)borate;
  tributylammonium tetrakis(pentafluorophenyl)borate;
  tripropylammonium tetrakis(o,p-dimethylphenyl)borate;
  tributylammonium tetrakis(m,m-dimethylphenyl)borate;
  tributylammonium tetrakis(p-trifluoromethylphenyl)borate;
  tributylammonium tetrakis(pentafluorophenyl)borate; and
  tri(n-butyl)ammonium tetrakis(o-tolyl)borate;
N,N-dialkylanilinium salts such as:
  N,N-dimethylanilinium tetrakis(pentafluorophenyl)borate;
  N,N-dimethylaniliniumtetrakis(heptafluoronaphthyl)borate;
  N,N-dimethylanilinium tetrakis(perfluoro-4-biphenyl)borate;
  N,N-dimethylanilinium tetraphenylborate;
  N,N-diethylanilinium tetraphenylborate; and
  N,N-2,4,6-pentamethylanilinium tetraphenylborate;
dialkyl ammonium salts such as:
  di-(isopropyl)ammonium tetrakis(pentafluorophenyl)borate; and
  dicyclohexylammonium tetraphenylborate; and
triaryl phosphonium salts such as:
  triphenylphosphonium tetraphenylborate;
  tri(methylphenyl)phosphonium tetraphenylborate; and
  tri(dimethylphenyl)phosphonium tetraphenylborate.

Further examples of suitable ionic NCA activators include:
  tropillium tetrakis(pentafluorophenyl)borate;
  triphenylmethylium tetrakis(pentafluorophenyl)borate;
  benzene(diazonium)tetrakis(pentafluorophenyl)borate;
  tropillium phenyltris(pentafluorophenyl)borate;
  triphenylmethylium phenyl-(trispentafluorophenyl)borate;
  benzene(diazonium)phenyl-tris(pentafluorophenyl)borate;
  tropillium tetrakis(2,3,5,6-tetrafluorophenyl)borate;
  triphenylmethylium tetrakis(2,3,5,6-tetrafluorophenyl)borate;
  benzene(diazonium)tetrakis(3,4,5-trifluorophenyl)borate;
  tropillium tetrakis(3,4,5-trifluorophenyl)borate;
  benzene(diazonium)tetrakis(3,4,5-trifluorophenyl)borate;
  tropillium tetrakis(3,4,5-trifluorophenyl)aluminate;
  triphenylmethylium tetrakis(3,4,5-trifluorophenyl)aluminate;
  benzene(diazonium)tetrakis(3,4,5-trifluorophenyl)aluminate;
  tropillinum tetrakis(1,2,2-trifluoroethenyl)borate;
  triphenylmethylium tetrakis(1,2,2-trifluoroethenyl)borate;
  benzene(diazonium)tetrakis(1,2,2-trifluoroethenyl)borate;
  tropillium tetrakis(2,3,4,5-tetrafluorophenyl)borate;
  triphenylmethylium tetrakis(2,3,4,5-tetrafluorophenyl)borate; and
  benzene(diazonium)tetrakis(2,3,4,5-tetrafluorophenyl)borate.

In the embodiment where the metallocene component metal ligands include halogen moieties (for example, bis-cyclopentadienyl zirconium dichloride, wherein the $R^1$ and $R^2$ groups in structures 1-3 are a halogen) which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-0 500 944 and EP-A1-0 570 982 for in situ processes describing the reaction of alkyl aluminum compounds with dihalo-substituted metallocene compounds prior to or with the addition of activating anionic compounds. For example, triethaluminum (TEAL) or MAO can be used to form the in situ reactive metallocene component.

In one embodiment of the catalyst system of the invention, the activator is associated with the fluorided support material to form a fluorided support composition. In another embodiment, the fluorided support material is associated with a metallocene to form a fluorided support composition. In yet another embodiment of the invention, the fluorided support is first associated with an activator, followed by association with a metallocene. In one embodiment, the activator is a non-coordinating anion. In another embodiment, the activator is bound to the fluorided support, wherein the metallocene then associates with the support composition.

Support Composition

The catalyst systems used in the process of this invention are preferably supported using a porous particulate material, such as for example, talc, inorganic oxides, inorganic chlorides and resinous materials such as polyolefins or other polymeric compounds. In particular, the catalyst system is typically the resultant composition from contacting at least the metallocene component, the activator component, and the support component.

Desirable support materials are porous inorganic oxide materials, which include those from the Periodic Table of Elements of Groups 2, 3, 4, 5, 13 or 14 metal oxides. Silica, alumina, silica-alumina, and mixtures thereof are particularly preferred. Other inorganic oxides that may be employed either alone or in combination with the silica, alumina or silica-alumina are magnesia, titania, zirconia, and the like.

In one embodiment, the support material is porous silica which has a surface area in the range of from 10 to 700 m$^2$/g, a total pore volume in the range of from 0.1 to 4.0 cc/g and an average particle size in the range of from 10 to 500 µm. Desirably, the surface area is in the range of from 50 to 500 m$^2$/g, the pore volume is in the range of from 0.5 to 3.5 cc/g and the average particle size is in the range of from 20 to 200 µm. In yet another embodiment, the surface area is in the range of from 100 to 400 m$^2$/g, the pore volume is in the range of from 0.8 to 3.0 cc/g and the average particle size is in the range of from 30 to 100 µm. The average pore size of typical porous support materials is in the range of from 10 to 1000 Å. Desirably, a support material is used that has an average pore diameter of from 50 to 500 Å, and from 75 to 350 Å in another embodiment. It may be desirable to dehydrate the silica at a temperature of from about 100° C. to about 800° C. anywhere from about 3 to about 24 hours.

In another embodiment of the support, the porous silica is fluorided by treatment with a fluorine compound prior to reacting the support with the metallocene or activator components. The fluorine compounds suitable for providing fluorine for the support are desirably inorganic fluorine containing compounds. Such inorganic fluorine containing compounds may be any compound containing a fluorine atom as long as it does not contain a carbon atom. Particularly desirable are inorganic fluorine containing compounds selected from the group consisting of $NH_4BF_4$, $(NH_4)_2SiF_6$, $NH_4PF_6$, $NH_4F$, $(NH_4)_2TaF_7$, $NH_4NbF_4$, $(NH_4)_2GeF_6$, $(NH_4)_2SmF_6$, $(NH_4)_2TiF_6$, $(NH_4)_2ZrF_6$, $MoF_6$, $ReF_6$, $GaF_3$, $SO_2ClF$, $F_2$, $SiF_4$, $SF_6$, $ClF_3$, $ClF_5$, $BrF_5$, $IF_7$, $NF_3$, $HF$, $BF_3$, $NHF_2$ and $NH_4HF_2$. Of these, $NH_4BF_4$, $(NH_4)_2SiF_6$ are desirable embodiments.

Ammonium hexafluorosilicate and ammonium tetrafluoroborate fluorine compounds are typically solid particulates as are the silicon dioxide supports. A desirable method of treating the support with the fluorine compound is to dry mix the two components by simply blending at a concentration of from 0.01 to 10.0 millimole F/g of support, desirably in the range of from 0.05 to 6.0 millimole F/g of support, and most desirably in the range of from 0.1 to 3.0 millimole F/g of support. The fluorine compound can be dry mixed with the support either before or after charging to the vessel for dehydration or calcining the support. Accordingly, the fluorine concentration present on the support is in the range of from 0.6 to 3.5 wt % of support.

Another method of treating the support with the fluorine compound is to dissolve the fluorine compound in a solvent, such as water, and then contact the support with the fluorine compound containing solution. When water is used and silica is the support, it is desirable to use a quantity of water which is less than the total pore volume of the support.

Dehydration or calcining of the silica is not necessary prior to reaction with the fluorine compound. Desirably, the reaction between the silica and fluorine compound is carried out at a temperature of from about 100° C. to about 1000° C., and more desirably from about 200° C. to about 600° C. for about two to eight hours.

The metallocenes, activator and support material may be combined in any number of ways. Suitable support techniques are described in U.S. Pat. Nos. 5,972,823 and 5,643,847, and WO 00/12565.

Regardless of whether the metallocenes and their activator are separately precontacted or whether the metallocenes and activator are combined at once, the total volume of reaction solution applied to porous support is less than about 4 times the total pore volume of the porous support in one embodiment, less than about 3 times the total pore volume of the porous support in another embodiment, and in the range of from more than about 1 to less than about 2.5 times the total pore volume of the porous support in yet another embodiment. Procedures for measuring the total pore volume of porous support are well known in the art. The preferred method is described in 1 EXPERIMENTAL METHODS IN CATALYST RESEARCH 67-96 (Academic Press 1968).

Methods of supporting ionic catalysts comprising metallocene cations and noncoordinating anions are described in WO 91/09882, WO 94/03506, WO 96/04319 and in co-pending U.S. Ser. No. 09/339,128, filed Jun. 24, 1999, now U.S. Pat. No. 6,368,999. The methods generally comprise either physical adsorption on traditional polymeric or inorganic supports that have been largely dehydrated and dehydroxylated, or using neutral anion precursors that are sufficiently strong Lewis acids to activate retained hydroxy groups in silica containing inorganic oxide or fluorided-modified supports such that the Lewis acid becomes bound to the support and a hydrogen of the hydroxy group is available to protonate the metallocene compounds.

The supported catalyst system may be used directly in polymerization or the catalyst system may be prepolymerized using methods well known in the art. For details regarding prepolymerization, see U.S. Pat. Nos. 4,923,833 and 4,921,825, EP 0 279 863 and EP 0 354 893.

Polymerization Processes

The metallocene supported catalyst composition is useful in coordination polymerization of unsaturated monomers conventionally known to be polymerizable under coordination polymerization conditions. Monomers suitable for the polymer of the invention include ethylene and $C_3$ to $C_{12}$ α-olefins. Such conditions also are well known and include solution polymerization, slurry polymerization, and low pressure gas phase polymerization. The metallocene supported catalysts compositions of the present invention are thus particularly useful in the known operating modes employing fixed-bed, moving-bed, fluid-bed, or slurry processes conducted in single, series or parallel reactors.

The polymers of this invention are prepared in a multiple stage process wherein homopolymerization is conducted in each stage separately—in parallel in one embodiment or, in series in another embodiment. Each stage may take place either in the same reaction chamber or vessel, or in separate reaction chambers or vessels for each stage. In each stage, propylene is desirably homopolymerized with the same catalyst system but with a different concentration of chain termination agent in at least two of the stages. The catalyst system of the invention typically has an efficiency of from 10 to 35 kg polymer/g catalyst in one embodiment, and from 15 to 30 kg polymer/g catalyst in another embodiment.

Examples of chain termination (or transfer) agents are those commonly used to terminate chain growth in Ziegler-Natta polymerization, a description of which can be found in *Ziegler-Natta Catalyst and Polymerization Hydrogen*; J.

Boor (Academic Press, 1979). Hydrogen and diethyl zinc are examples of agents that are very effective in the control of polymer molecular weight in olefin polymerizations. Hydrogen is the preferred agent.

The concentration of chain termination agent in one stage is preferably sufficient to produce propylene homopolymer having a melt flow rate in the range of from 0.15 dg/min. to 4.0 dg/min, preferably from 0.2 dg/min to 2.0 dg/min, even more preferably from 0.2 dg/min to 1.0 dg/min and a molecular weight distribution (Mw/Mn) in the range from 1.8 to 2.5 and preferably from 1.8 to 2.3. The concentration of chain termination agent in a separate, either earlier or later stage, is preferably sufficient to produce homopolymer having a melt flow rate in the range of from 5 dg/min to 1000 dg/min, preferably from 20 dg/min to 200 dg/min and most preferably from 30 dg/min to 100 dg/min and a molecular weight distribution (Mw/Mn) in the range from 1.8 to 2.5 and preferably from 1.8 to 2.3. The homopolymer produced from each stage combines to form a final isotactic polypropylene homopolymer product having a MWD that is in the range of from 1.5 to 20.0 in one embodiment, from 1.7 to 20.0 in another embodiment, and from 1.7 to 7.0 in yet another embodiment, and from 1.7 to 5.0 in yet another embodiment.

The final homopolymer product comprises a reactor blend of the products prepared in the stages described above. Preferably the final product is comprised of from about 40% to about 80% product from the low melt flow rate stage and from about 20% to about 60% product from the high melt flow rate stage, more preferably from about 55% to about 65% product from the low melt flow rate stage and from about 35% to about 45% product from the high melt flow rate stage. The most desirable final melt flow rate is in the range of from about 0.2 to about 30 dg/min.

Although an embodiment of this invention includes novel homopolymers with a unique combination of quite broad molecular weight distribution yet good physical properties and low extractables levels, it will be clear to persons skilled in the art that similarly unique combinations of properties will also be possible with copolymers, where controlled levels of comonomer(s) are additionally employed.

Individually, each stage may involve any process including gas, slurry or solution phase or high pressure autoclave processes. Preferably a slurry (bulk liquid propylene) polymerization process is used in each stage.

A slurry polymerization process generally uses pressures in the range of from about 1 to about 100 atmospheres (about 0.1 to about 10 MPa) or even greater and temperatures in the range of from −60° C. to about 150° C. In a slurry polymerization, a suspension of solid, particulate polymer is formed in a liquid or supercritical polymerization medium to which propylene and comonomers and often hydrogen along with catalyst are added. The liquid employed in the polymerization medium can be, for example, an alkane or a cycloalkane. The medium employed should be liquid under the conditions of polymerization and relatively inert such as hexane and isobutane. In the preferred embodiment, propylene serves as the polymerization diluent and the polymerization is carried out using a pressure of from about 200 kPa to about 7,000 kPa at a temperature in the range of from about 50° C. to about 120° C.

Polymer and Films

The polymers of this invention are a reactor blend of isotactic homopolymers having differing weight average molecular weights such that the final isotactic polypropylene polymer has a molecular weight distribution that is in the range of from 1.5 to 20.0 in one embodiment, from 1.7 to 20.0 in another embodiment, from 1.7 to 7.0 in yet another embodiment, and in yet another embodiment from 1.7 to 5.0.

The propylene homopolymers of this invention are particularly suitable for oriented film applications and preferably have a weight avenge molecular weight (Mw) that is in the range of from about 140,000 to about 750,000 in one embodiment, and from about 150,000 to about 500,000 in another embodiment, and from about 200,000 to about 400,000 in yet another embodiment. These polymers have a melt flow rate (MFR) that is in the range of from about 0.2 dg/min to about 30 dg/min in one embodiment, from about 0.5 dg/min to about 20.0 dg/min in another embodiment, and from about 1.0 dg/min to about 10.0 dg/min in yet another embodiment. The melting point of the polymer is greater than about 145° C. in one embodiment, and greater than about 150° C. in another embodiment and greater than about 155° C. in yet another embodiment. Upper limits for melting point depend on the specific application and metallocene used but would typically not be higher than 180° C. The hexane extractables level (as measured by 21 CFR 177.1520 (d)(3)(i)) of the final polymer product is less than 2.0 wt % in one embodiment and less than 1.0 wt % in yet another embodiment despite the broad MWD.

Due to the high reactivity of the catalyst system described herein the polymer and film of the present invention is also characterized in having a relatively low level of metal and ionic recoverables both prior to deashing and after deashing relative to prior art methods of making polymers and films. The aluminum and chlorine recoverables (combined) of the homopolymer of the invention range from less than 25 ppm in one embodiment, less than 15 ppm in another embodiment, and less than 10 ppm in yet another embodiment. In yet another embodiment, the aluminum and chlorine recoverables ranges from 10 ppm to 25 ppm.

The propylene homopolymers of this invention exhibit exceptional film orientability and the films exhibit a good balance of properties. Any film fabrication method may be used to prepare the oriented films of this invention. Typically, commercially desirable oriented polypropylene films are biaxially oriented sequentially or simultaneously. In one embodiment, the film is first longitudinally oriented and then oriented in the transverse direction, while simultaneous orientation processes are carried out in another embodiment. Two well known oriented film fabrication processes include the tenter frame process and the double bubble process.

We have found that the novel structure of the isotactic propylene homopolymers of this invention translates to distinct differences versus standard films made with today's Ziegler-Natta produced propylene polymers and compared with films produced in a single stage polymerization process designed to produce narrow molecular weight distribution. As discussed in more detail below, biaxial stretching studies show that the films of this invention have a substantially broader processability range and can be evenly stretched at lower temperature. Stretching studies at elevated temperatures on cast sheets along machine direction (MD) and transverse direction (TD) indicate that the films of this invention stretch easily without breaking at lower stretching temperatures when compared to Ziegler-Natta produced propylene polymers. This indicates a capability to operate at significantly higher line speeds on commercial tenter frame lines, while still making oriented films having good clarity, stiffness and baffler properties.

The final films of this invention may generally be of any thickness, however, preferably the thickness is in the range of from about 1-150 μm, preferably 1-100 μm, and more preferably, 1 to 75 µm. There is no particular restriction with respect to draw ratio on film stretching, however, in one embodiment the draw ratio is from about 4 to about 10 fold for monoaxially oriented films and from about 4 to about 15 fold in the transverse direction in the case of biaxially oriented films. Machine direction (MD) and transverse direction (TD) stretching is preferably carried out at a temperature in the range of from about 70° C. to about 200° C. in one embodiment, from about 80° C. to about 190° C. in yet another embodiment. The films may be coextruded or laminated and/or may be single or multi-layered with the film of the invention comprising at least one component of the layers, typically the core layer.

Additives may be included in the film polymers of this invention. Such additives and their use are generally well known in the art. These include those commonly employed with plastics such as heat stabilizers or antioxidants, neutralizers, slip agents, antiblock agents, pigments, antifogging agents, antistatic agents, clarifiers, nucleating agents, ultraviolet absorbers or light stabilizers, fillers and other additives in conventional amounts. Effective levels are known in the art and depend on the details of the base polymers, the fabrication mode and the end application. In addition, hydrogenated and/or petroleum hydrocarbon resins may be used as additives.

The film surfaces may be treated by any of the known methods such as corona or flame treatment. In addition standard film processing (e.g. annealing) and converting operations may be adopted to transform the film at the line into usable products.

Test Methods

Film Preparation. Films were prepared on TM Long stretching apparatus. MD×TD stretching ratio=6×6; preheat time 27 sec. Stretching temperature was 154° C. for all samples. Film thickness determined using a profilometer; Haze measured per ASTM D 1003; Gloss per ASTM D 2457; WVTR (water vapor transmission rate) per ASTM F 372; Tensile properties and 1% secant modulus by ASTM D 882.

Molecular Weight and Distribution. Molecular weights and molecular weight distribution (Mw/Mn) was determined using Gel Permeation Chromatography.

Melting Temperature. The melting temperature and crystallization temperature were determined from peak temperatures from differential scanning calorimeter (DSC) runs at 10° C./min. heating and cooling rates.

Melt Flow Rate. MFR was determined via the method of ASTM D 1238-95 Condition L.

Heat Deflection Temperature. The HDT was determined by the method of ISO 75-2/Be.

Recoverable Compliance. This is measured using a Rhemetric Stress Rheometer. Polymer is melted at 230° C., $1 \times 10^4$ dyne/cm$^2$ stress for 180 seconds. Then the stress is released to zero to allow the polymer to recover the deformation. The recoverable compliance is the strain normalized by the stress recovery.

$^{13}$C Nuclear Magnetic Resonance. Characterization by NMR is accomplished as described in *Polymer Sequence Determination by $^{13}$C NMR Method*, by J. C. Randall (1977). The instrument used is a Varian Unity Plus 300, calibrated using a mixture of 1,2,4-Trichlorobenzene and deuterobenzene. Only the CH$_3$ region of the spectrum was used for calculating the diads, triads, and pentads.

Deashing. The process of deashing or washing the polymer is performed after the polymerization process on ambient temperature granules or beads of the homopolymer. The granules are washed in a counter current with a solvent such as an alcohol, for example isobutanol (2-methyl-1-propanol), and liquid propylene at a temperature of from 25° C. to 80° C., either in a mixture or alone.

Metal and Ionic Recoverables Determination. The metals were measured using Inductively Coupled Plasma Atomic Emission Spectroscopy (ICP-AES) (Jobin-Yvon Emission Division of Instrument S. A., Model JY138 Ultrace), while chloride and silicon ions were determined using X-Ray Fluorescence (XRF) (Philips X-Ray Analytical Co, Model PW1404). The instruments are calibrated by determining the intensities of a series of known concentration standards and fitting those values to a calibration curve. For ICP-AES, the samples to be measured were first washed, then dissolved in an appropriate acidic solution, followed by appropriate dilution to fall within the standard calibration curve. For XRF, compression molded plaques were prepared for Cl and Si determination.

Xylene Solubles. Xylene solubles were determined by 21 CFR 177.1520 (d)(4)(i).

EXAMPLES

Embodiments of the polypropylene consistent with this invention are exemplified in the example descriptions below. Each example of the invention is numbered and labeled as EX1, EX2, and so forth. Comparative examples showing polypropylene made by prior art techniques are labeled as C1, C2, and so forth. The examples below are exemplary and are by no means intended to be limiting of the present invention.

Preparation of Fluorided Silica. 48.5 grams of SiO$_2$ (Grace Davison, a subsidiary of W. R. Grace Co., Conn.) as Sylopol®952 ("952 silica gel") having a N$_2$ pore volume 1.63 cc/g and a surface area of 312 m$^2$/g, was dry mixed with 1.5 grams ammonium hexafluorosilicate (Aldrich Chemical Company, Milwaukee Wis.). The ammonium hexafluorosilicate added corresponds to 1.05 millimole F per gram silica gel. The mixture was transferred to a 5 cm ID by 50 cm vycor glass tube having a medium frit plug 3.8 cm from one end. The tube was inserted into a tube furnace and flow of N$_2$ (220 cc/min) was passed up through the frit to fluidize the silica bed. The furnace was heated according to the following schedule:

Raise the temperature from 25 to 150° C. over 5 hours

Hold the temperature at 150° C. for 4 hours

Raise the temperature from 150 to 500° C. over 2 hours

Hold the temperature at 500° C. for 4 hours

Heat off and allow to cool under N$_2$

When cool, the fluorided silica was stored under N$_2$.

Preparation of Catalyst used for Examples. In a nitrogen purged glove box, 394.32 grams of fluorided silica was massed and placed in a 3-neck 4L reactor equipped with an overhead stirrer. 2L of dry toluene was added and the mixture was vigorously stirred. 27.6 ml of N,N-diethyl aniline was added via syringe. 86.0 grams of tris(perfluorphenyl)boron was added as a solid. The mixture was stirred for 1 hour. 5.99 grams of Dimethylsilybis(2-methyl-4-phenyl indenyl)zirconium dimethyl was added and the mixture was stirred for 2 hours. The solvent was decanted and the solid was vacuum dried overnight. Yield: 423 grams. Catalyst loading was found to be 0.02 mmol of transition metal per gram of finished catalyst.

Example 1

The finished catalyst composition was oil slurried with Drakeol™ white mineral oil (Witco Chemical) for ease of addition to the reactor. The procedure for polymerizing Example 1 was as follows. The polymerization was conducted in a pilot scale, two reactor, continuous, stirred tank, bulk liquid-phase process. The reactors were equipped with jackets for removing the heat of polymerization. The reactors were equipped with jackets for removing the heat of polymerization. The reactor temperature was set at 74° C. in the first reactor and 68° C. in the second reactor. Catalyst was fed at a rate of 1.4 g/hr. TEAL (1 wt % in hexane) was used as a scavenger at a rate of 4.1 cc/min. The catalyst system prepared above was fed as a 10% slurry in mineral oil and was flushed into the reactor with propylene. Propylene monomer was fed to the first reactor at a rate of 79 kg/hr and to the second reactor at a rate of 32 kg/hr. Hydrogen was added for molecular weight control at 1250 mppm in the first reactor and 1500 mppm in the second reactor. Reactor residence time was about 2.5 hours in the first reactor and about 1.9 hours in the second reactor. Polymer production rates were about 29 kg/hr in the first reactor and 14 kg/hr in the second reactor. The polymerized granular product was subsequently washed with liquid propylene fed to the extractor at 45 kg/hr flow rate. Polymer was discharged from the reactors as granular product having a MFR of 2.3 dg/min. 68% of the final polymer product was derived from the first stage and 32% of the final polymer product was derived from the second stage.

Example 2

Example 2 was prepared in similar fashion as described above for Example 1. The procedure for polymerizing Example 2 was the same as for Example 1 except that propylene monomer was fed to the first reactor at a rate of 79 kg/hr and to the second reactor at a rate of 32 kg/hr, hydrogen was added at 700 mppm in the first reactor and 3050 mppm in the second reactor, reactor residence time was about 2.5 hours in the first reactor and about 1.9 hours in the second reactor, and polymer production rates were about 16 kg/hr in the first reactor and 14 kg/hr in the second reactor. Polymer was discharged from the reactors as granular product having a MFR of 4.1 dg/min. 52% of the final polymer product was derived from the first stage and 48% of the final polymer product was derived from the second stage.

Example 3

Example 3 was prepared in similar fashion as described above for Example 2. The procedure for polymerizing Example 3 was the same as for Example 2 except that propylene monomer was fed to the first reactor at a rate of 68 kg/hr and to the second reactor at a rate of 75 kg/hr, hydrogen was added at 500 mppm in the first reactor and 5000 mppm in the second reactor, reactor residence time was about 3.0 hours in the first reactor and about 1.4 hours in the second reactor, and polymer production rates were about 20 kg/hr in the first reactor and 14 kg/hr in the second reactor. Polymer was discharged from the reactors as granular product having a MFR of 4.5 dg/min. 60% of the final polymer product was derived from the first stage and 40% of the final polymer product was derived from the second stage.

Example 4

Example 4 was prepared in similar fashion as described above for Example 3. The procedure for polymerizing Example 4 was the same as for Example 3 except that propylene monomer was fed to the first reactor at a rate of 68 kg/hr and to the second reactor at a rate of 75 kg/hr, hydrogen was added at 450 mppm in the first reactor and 5600 mppm in the second reactor, reactor residence time was about 3.0 hours in the first reactor and about 1.4 hours in the second reactor, and polymer production rates were about 18 kg/hr in the first reactor and 12 kg/hr in the second reactor. Polymer was discharged from the reactors as granular product having a MFR of 4.1 dg/min. 60% of the final polymer product was derived from the first stage and 40% of the final polymer product was derived from the second stage.

Example 5

Example 5 was prepared in similar fashion as described above for Example 4. The procedure for polymerizing Example 5 was the same as for Example 4 except that propylene monomer was fed to the first reactor at a rate of 68 kg/hr and to the second reactor at a rate of 75 kg/hr, hydrogen was added at 550 mppm in the first reactor and 5500 mppm in the second reactor, reactor residence time was about 3.0 hours in the first reactor and about 1.6 hours in the second reactor, and polymer production rates were about 21 kg/hr in the first reactor and 15 kg/hr in the second reactor. Polymer was discharged from the reactors as granular product having a MFR of 5.5 dg/min. 58% of the final polymer product was derived from the first stage and 42% of the final polymer product was derived from the second stage.

Example 6

Example 6 was prepared in similar fashion as described above for Example 5. The procedure for polymerizing Example 6 was the same as for Example 5 except that propylene monomer was fed to the first reactor at a rate of 68 kg/hr and to the second reactor at a rate of 75 kg/hr, hydrogen was added at 600 mppm in the first reactor and 5500 mppm in the second reactor, reactor residence time was about 3.0 hours in the first reactor and about 1.4 hours in the second reactor, and polymer production rates were about 21 kg/hr in the first reactor and 15 kg/hr in the second reactor. Polymer was discharged from the reactors as granular product without the subsequent liquid propylene washing step having a MFR of 5.1 dg/min. 58% of the final polymer product was derived from the first stage and 42% of the final polymer product was derived from the second stage.

Comparative Example 1

This polypropylene is a commercially available resin sold by ExxonMobil Chemical Co. (Houston, Tex.), and is catalyzed using Ziegler-Natta catalyst and a DEAC (diethylaluminumchloride) cocatalyst.

Comparative Example 2

The preparation of Comparative Example 2 was the same as described in WO 9958587 Sample B.

Comparative Example 3

This polypropylene is a commercially available resin sold by ExxonMobil Chemical Co. (Houston, Tex.), and is catalyzed using magnesium supported Ziegler-Natta catalyst and an alkoxysilane electron donor.

Comparative Example 4

The polypropylene is a commercially available resin sold by ExxonMobil Chemical Company (Houston Tex.), and is catalyzed using Ziegler-Natta catalyst and a DEAC (diethylaluminum chloride) cocatalyst.

Discussion of Examples

In a preferred embodiment, the homopolymer of the invention is homopolymerized with high molecular weight in one stage and lower molecular weight in a second stage to yield a polymer having a broad molecular weight distribution, as shown in Tables 1 and 2. In one embodiment, the MWD of the homopolymer is from 1.7 to 7.0, and from 1.7 to 5.0 in another embodiment. This relatively broad MWD range results in an advantageously high recoverable compliance and heat deflection temperature (HDT) as shown in Table 2. Specifically, the recoverable compliance, which is a measure of the elasticity of the finished polymer, is comparable or higher for EX3, EX4, and EX5 than the value for C1. Further, the HDT values for all of the invention examples (EX1, and EX3-5) are significantly higher than the HDT value of C1. This leads to advantageous properties for oriented films.

The homopolymer of the present invention also has an advantageously low level of metals and conductive ions relative to comparative examples. In particular, it is advantageous to eliminate such ions as $Al^{3+}$ and $Cl^-$, or metals of aluminum and other chlorine species from the homopolymer. In Table 3, EX6 has lower recoverables value for the Al and Cl ions than that for the comparative examples. Even when compared to C4 in Table 3, which has been deashed or washed, an embodiment of the polymer of the invention in EX6 has a low level of metals and conductive ions. This is advantageous for capacitor film applications and other applications requiring a low level of electrical conductivity, or high electrical resistance.

An attribute of the propylene homopolymers of the present invention is the low metal residues, which makes the homopolymer of the invention advantageous for use in applications that have stringent cleanliness requirements such as capacitor film applications. These properties exist in part due to the lower level of catalyst and activator that is required to perform the polymerization relative to other known catalysts. For example, Table 3 shown that the activity of one embodiment of the metallocene catalyst system of the invention is 24 kg/g, which is higher than other metallocenes, which range from 7 to 14 kg/g. Although the Ziegler-Natta catalysts may have a higher activity, they also have a much higher level of metals and ions present in the final polypropylene except silicon coming from the silica support of the metallocene catalyst system. This attribute makes the polypropylene of the present invention ideal for low conductivity applications. Specifically, the polypropylene can be used a dielectric material in capacitors.

The HDT at 0.45 MPa values of the homopolymer of the invention range from 90 to 110° C. in one embodiment, and from 95 to 105° C. in another embodiment. The aluminum and chlorine recoverables of the homopolymer of the invention range from less than 25 ppm in one embodiment, less than 20 ppm in another embodiment, and less than 15 ppm in yet another embodiment. In yet another embodiment, the aluminum and chlorine recoverables ranges from 15 ppm to 25 ppm. The NMR detectable pentads for the polypropylene of the invention was greater than 93 mol % in one embodiment. Finally, the recoverables compliance ranges from 1.0 to 5.0 $Pa^{-1} \times 10^{-4}$ in one embodiment.

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the true scope of the present invention.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

TABLE 1

Polypropylene homopolymer production data.

| | Process | | | | | Product |
|---|---|---|---|---|---|---|
| Sample | Temperature R1/R2 (° C.)[1] | $H_2$, R1/R2 (mppm) | Residence Time (hrs) | Production Rate (kg/hr) | Production Split, R1/R2 (%) | MFR R1/R2/final (dg/min) |
| EX1 | 74/68 | 1250/1500 | 2.5/1.9 | 43 | 68/32 | 3.4/3.3/2.3 |
| EX2 | 74/68 | 700/3050 | 2.5/1.9 | 30 | 52/48 | 0.7/4.2/4.1 |
| EX3 | 74/68 | 500/5000 | 3/1.4 | 34 | 60/40 | 0.3/3.9/4.5 |
| EX4 | 74/68 | 450/5600 | 3/1.4 | 30 | 60/40 | 0.3/3.1/4.1 |
| EX5 | 74/68 | 550/5500 | 3/1.6 | 36 | 58/42 | 0.7/8.7/5.5 |
| EX6 | 74/68 | 600/5500 | 3/1.4 | 36 | 58/42 | 0.5/4.9/6.1 |

[1]R1 is reactor 1 or the first reactor, and R2 is reactor 2 or the second reactor. "Final" is the final polypropylene homopolymer.

TABLE 2

Physical properties of the polypropylene homopolymers from Table 1, and a comparative example.

| Property | C1 | EX1 | EX2 | EX3 | EX4 | EX5 |
|---|---|---|---|---|---|---|
| MFR (dg/min) | 2.8 | 2 | 2.5 | 1.6 | 1.2 | 2.3 |
| Xylene Solubles (wt %) | 3.8 | <1 | <1 | <1 | <1 | <1 |
| Heptane Insolubles (wt %) | 95 | 96.7 | — | 94.1 | 93.5 | 92.6 |
| HDT @ 0.45 MPa (° C.) | 82 | 98 | — | 97 | 99 | 98 |

TABLE 2-continued

Physical properties of the polypropylene homopolymers from Table 1, and a comparative example.

| | C1 | EX1 | EX2 | EX3 | EX4 | EX5 |
|---|---|---|---|---|---|---|
| Recoverable Compliance (Pa$^{-1}$ × 10$^{-4}$) | 4.5 | 1.5 | 2.8 | 4.9 | 4.7 | 4.2 |
| GPC data | | | | | | |
| Mn (×10$^3$) | 58 | 136 | 90 | 87 | 70 | 80 |
| Mw (×10$^3$) | 310 | 283 | 280 | 307 | 329 | 279 |
| Mz (×10$^3$) | 933 | 473 | 563 | 643 | 703 | 561 |
| Mw/Mn | 5.3 | 2.1 | 3.1 | 3.5 | 4.7 | 3.5 |
| Mz/Mw | 3.0 | 1.7 | 2.0 | 2.1 | 2.1 | 2.0 |
| $^{13}$C NMR Data | | | | | | |
| Pentads (mol %) | 90.6 | 93.3 | — | 93.3 | 93.4 | 93.2 |
| Triads (mole %) | 94.6 | 97.4 | — | 97.1 | 97.7 | 97.1 |
| Diads (mole %) | 96.1 | 98.4 | — | 98.2 | 98.4 | 98.2 |

TABLE 3

Comparative metallic and conductive ion residues in polypropylene homopolymers.

| Element (ppm) | EX5[1] | EX6[2] | C1[1] | C2[1] | C3[2] | C4[1] |
|---|---|---|---|---|---|---|
| Ti | 0 | 0 | 5 | 0 | 0 | 3 |
| Al | 4 | 10 | 15 | 9 | 25 | 9 |
| Cl | 2 | 2 | 15 | 2 | 19 | 7 |
| Mg | 0 | 0 | 0 | 0 | 3 | 0 |
| Zr | 0 | 0 | 0 | 0 | 0 | 0 |
| Si | 47 | 43 | 0 | 0 | 0 | 0 |
| Catalyst Efficiency (kg polymer/g catalyst) | | | | | | |
| | 24 | 24 | 10 | 14 | 45 | 10 |

[1] All values after washing.
[2] All vales prior to washing.

TABLE 4

Comparison of biaxially oriented polypropylene film properties.

| | EX1 | EX2 | EX3 | EX4 | EX5 | C1 |
|---|---|---|---|---|---|---|
| Film Property | | | | | | |
| MFR (dg/min) | 2.0 | 2.5 | 1.6 | 1.2 | 2.3 | 2.8 |
| Thickness (μm) | 15 | 15 | 15 | 15 | 18 | 18 |
| Haze (%) | 0.3 | 0.4 | 0.5 | 0.4 | 0.3 | 0.3 |
| Gloss @ 45° | 94 | 93 | 93 | 94 | 94 | 95 |
| WVTR (g/m2/day per 25.4 μm) | 5.5 | 5.5 | 5.3 | 5.6 | 5.8 | 8.4 |
| 1% Sec. Modulus (MPa) MD/TD | 2459/2440 | 2477/2773 | 2742/2473 | 2587/2634 | 2759/2641 | 2798/2845 |
| Tensile Strength (MPa) MD/TD | | | | | | |
| @ Yield | 62/76 | 71/67 | 62/67 | 69/69 | 79/73 | 61/68 |
| @ Break | 190/231 | 184/152 | 166/158 | 228/208 | 195/215 | 209/175 |
| Elongation (%) MD/TD | | | | | | |
| @ Yield | 6.1/6.6 | 5.7/6.3 | 5.1/6.3 | 6.3/6.4 | 6.7/6.5 | 4.8/4.7 |
| @ Break | 65/61 | 57/32 | 33/34 | 82/66 | 53/64 | 78/37 |
| Shrinkage @ 135° C., 180 Sec (%) MD/TD | 22/23 | 20/21 | 20/19 | 19/22 | 18/19 | 19/19 |

We claim:

1. A polypropylene film comprising isotactic polypropylene homopolymer having a combined aluminum, and chlorine recoverables value of less than 10 ppm, melt flow rate of from greater than 1.0 to 30 dg/min, a MWD of from 3.1 to 20 and xylene solubles of less than 1 wt % relative to the total weight of the homopolymer.

2. The film of claim 1, wherein the liomopolymer has a heat deflection temperature at 0.45 MPa of from 90° C. to 110° C.

3. The film of claim 1, wherein the homopolymer has a heat deflection temperature at 0.45 MPa of from 95° C. to 105° C.

4. The film of claim 1, further having a MWD of from 3.1 to 5.0.

5. The film of claim 1, further having a MWD of from 3.1 to 7.0.

6. The film of claim 1, further having a hexane extractables of less than 1 wt % relative to the total weight of the homopolymer.

7. The film of claim 1, wherein the film is a dielectric material in a capacitor.

8. The film of claim 1, wherein the homopolymers has a MFR of from greater than 1.0 to 10 dg/min.

9. A film comprising isotactic polypropylene homopolymer having a combined aluminum and chlorine recoverables value of less than 10 ppm, melt flow rate of from greater than 1.0 to 30 dg/min, a MWD of from 3.1 to 20 and xylene solubles of less than 1 wt % relative to the total weight of the homopolymer formed by:

(a) first, polymerizing propylene in the presence of a metallocene, a highly fluorinated trisarylboron activator compound, and a first concentration of chain transfer agent sufficient to produce a first propylene homopolymer;

(b) second, polymerizing propylene in the presence of the first propylene homopolymer, and also in the presence of a second concentration of chain transfer agent; and (c) recovering the isotactic polypropylene homopolymer.

10. The film of claim 9, wherein the isotactic polypropylene homopolymer has a heat deflection temperature at 0.45 MPa of from 90° C. to 110° C.

11. The film of claim 9, wherein the isotactic polypropylene homopolymer has a heat deflection temperature at 0.45 MPa of from 95° C. to 105° C.

12. The film of claim 9, wherein the metallocene is a single metallocene.

13. The film of claim 12, wherein the single metallocene is present in step (b).

14. The film of claim 9, wherein the highly fluorinated trisarylboron activator compound is selected from the group consisting of trisperfluorophenylboron, tris(3,5-di(trifluoromethyl)phenyl)boron, tris(di-t-butylmethylsilyl)perfluorophenylboron, and mixtures thereof.

15. The film of claim 9, wherein the isotactic polypropylene homopolymers has MFR of from greater than 1.0 to 10 dg/min.

16. The film of claim 9, wherein the isotactic polypropylene homopolymer is washed.

* * * * *